United States Patent
Cordova

(10) Patent No.: US 11,097,957 B2
(45) Date of Patent: Aug. 24, 2021

(54) APPARATUS AND METHOD FOR FILTERING WATER

(71) Applicant: FairCap CIC, London (GB)

(72) Inventor: Mauricio Cordova, Barcelona (ES)

(73) Assignee: FairCap CIC, London (GB)

( * ) Notice: Subject to any disclaimer, the term of this patent is extended or adjusted under 35 U.S.C. 154(b) by 132 days.

(21) Appl. No.: 16/218,274

(22) Filed: Dec. 12, 2018

(65) Prior Publication Data
US 2020/0189932 A1    Jun. 18, 2020

(51) Int. Cl.
| | | |
|---|---|---|
| C02F 1/00 | (2006.01) | |
| B01D 35/30 | (2006.01) | |
| B01D 39/16 | (2006.01) | |
| B01D 39/20 | (2006.01) | |
| C02F 1/28 | (2006.01) | |
| C02F 1/44 | (2006.01) | |
| B01D 35/02 | (2006.01) | |
| C02F 103/00 | (2006.01) | |

(52) U.S. Cl.
CPC .............. *C02F 1/002* (2013.01); *B01D 35/02* (2013.01); *B01D 35/306* (2013.01); *B01D 39/1607* (2013.01); *B01D 39/2055* (2013.01); *C02F 1/283* (2013.01); *C02F 1/444* (2013.01); *B01D 2221/02* (2013.01); *B01D 2239/0421* (2013.01); *B01D 2239/0428* (2013.01); *B01D 2239/1233* (2013.01); *C02F 2103/007* (2013.01); *C02F 2201/002* (2013.01); *C02F 2303/04* (2013.01); *C02F 2307/02* (2013.01)

(58) Field of Classification Search
None
See application file for complete search history.

(56) References Cited

U.S. PATENT DOCUMENTS

| | | | | |
|---|---|---|---|---|
| 2,796,850 A | * | 6/1957 | Emerson | ................. B43K 5/14 |
| | | | | 401/242 |
| 3,567,632 A | * | 3/1971 | Richter | ................. B01D 71/56 |
| | | | | 210/321.6 |

(Continued)

FOREIGN PATENT DOCUMENTS

KR    20070000566 A    *    1/2007

OTHER PUBLICATIONS

Cordova et al., Office Action dated Jan. 13, 2020, directed to Design U.S. Appl. No. 29/673,209; 8 pages.

(Continued)

*Primary Examiner* — Chester T Barry
(74) *Attorney, Agent, or Firm* — Morrison & Foerster LLP

(57) ABSTRACT

A method of filtering water contained in a squeezable bottle includes filling the squeezable water bottle with water; screwing a portable filtration apparatus onto the squeezable water bottle, the portable filtration apparatus includes a cap piece, the cap piece having a mouthpiece and a threaded portion, wherein the threaded portion is configured to screw onto the squeezable bottle; and a filter fluidly connected to the cap piece, wherein the filter comprises a plurality of hydrophilic hollow fibers and hydrophobic hollow fibers, the hydrophobic fibers are configured to allow air to flow into the squeezable bottle; flowing a filtrate out through the mouthpiece from the filter in response to a pressure differential between an inside portion of the squeezable bottle and an outside portion of the squeezable bottle.

19 Claims, 4 Drawing Sheets

(56) References Cited

U.S. PATENT DOCUMENTS

| | | | | |
|---|---|---|---|---|
| 4,636,307 | A | * | 1/1987 | Inoue ................ B01D 19/0031 210/188 |
| 4,879,032 | A | * | 11/1989 | Zemlin .............. C08G 18/5021 210/321.61 |
| H1157 | H | | 4/1993 | Yanou et al. |
| 5,225,079 | A | * | 7/1993 | Saito ................. B01D 19/0031 210/321.61 |
| D385,946 | S | | 11/1997 | Harrison et al. |
| D404,113 | S | | 1/1999 | Denkewicz, Jr. et al. |
| 6,165,362 | A | | 12/2000 | Nohren, Jr. et al. |
| D448,448 | S | | 9/2001 | Hughes et al. |
| 6,395,170 | B1 | | 5/2002 | Hughes et al. |
| 6,569,329 | B1 | | 5/2003 | Nohren, Jr. |
| D536,205 | S | | 2/2007 | Jensen et al. |
| D551,318 | S | | 9/2007 | MacNeil et al. |
| D571,433 | S | | 6/2008 | Koteskey |
| D596,703 | S | | 7/2009 | McKinney |
| D621,660 | S | | 8/2010 | Smiedt et al. |
| D631,286 | S | | 1/2011 | Smiedt et al. |
| D643,090 | S | | 8/2011 | Cumberland et al. |
| RE42,669 | E | * | 9/2011 | Henshaw ............ B01D 63/043 210/636 |
| 8,852,439 | B2 | | 10/2014 | Frauchiger et al. |
| D753,790 | S | | 4/2016 | Torgerud |
| D753,791 | S | | 4/2016 | Rashid et al. |
| 9,469,550 | B2 | | 10/2016 | Closi, Jr. et al. |
| D773,014 | S | | 11/2016 | Pale |
| D776,239 | S | | 1/2017 | Westrick et al. |
| D815,247 | S | | 4/2018 | Homer |
| D815,714 | S | | 4/2018 | Bell et al. |
| 2002/0056675 | A1 | * | 5/2002 | Hegde ................ B01D 63/021 210/188 |
| 2002/0074365 | A1 | * | 6/2002 | Young ................ B65D 47/243 222/484 |
| 2005/0035041 | A1 | * | 2/2005 | Nohren, Jr. ............ B01D 61/20 210/209 |
| 2009/0014366 | A1 | * | 1/2009 | Takeda .................... C02F 9/005 210/87 |
| 2013/0199989 | A1 | | 8/2013 | Carter et al. |
| 2014/0083564 | A1 | * | 3/2014 | Yan ...................... B41J 2/17506 141/319 |
| 2014/0175098 | A1 | * | 6/2014 | Lane ........................ A45F 3/16 220/212.5 |
| 2015/0374169 | A1 | * | 12/2015 | Salas-de la Cruz .... A47J 31/00 99/290 |
| 2016/0251234 | A1 | * | 9/2016 | Hayslett ................ B01D 39/14 210/244 |
| 2020/0189932 | A1 | * | 6/2020 | Cordova .............. B01D 35/306 |

OTHER PUBLICATIONS

Cordova. (2017). "Faircap: The Open Water Filter," located at <https://web.archive.org/web/20171019082520/https://challenge.whatdesigncando.com/projects/faircap-the-open-water-filter/> visited on Dec. 29, 2019. (5 pages).

Cordova. (Apr. 13, 2015). "How It All Started," located at <http://faircap.org/how-it-all-started-2/> visited on Dec. 29, 2019. (6 pages).

"LifeStraw Choose Your Product," located at https://web.archive.org/web/20180105052937/https://lifestraw.eartheasy.com/ visited on Jan. 5, 2018. (7 pages).

"LifeStraw Universal," located at https://web.archive.org/web/20170822114011/http://lifestraw.com/products/lifestraw-universal/ visited on Aug. 22, 2017. (3 pages).

"Polysulfone Hollow Fiber Membrane," located at http://www.filcore.co.kr/neweng/images/data/filcore_product_descriptions.pdf visited on Dec. 6, 2018. (33 pages).

"Water Purifier," located at http://www.filcore.co.kr/neweng/html/products/products01.html visited on Dec. 18, 2018. (3 pages).

* cited by examiner

APPARATUS AND METHOD FOR FILTERING WATER

FIELD OF THE INVENTION

This invention relates generally to water filtration and, more specially, to portable water filters.

BACKGROUND OF THE INVENTION

Access to clean water is an issue in areas that do not have the infrastructure in place to filter contaminated sources of water. Some areas may also lack the monetary funds to install the appropriate infrastructure to remove contaminants and distribute clean water. In such areas, contaminated water may contain harmful levels of microbiological and chemical contaminants, rendering the water unsafe to drink.

Bottled water may be purchased commercially, however, communities, families, or individuals that lack access to clean water may also lack the funds to purchase one-time use bottled water. Furthermore, there are areas may lack both access to clean water and bottled water. In addition, travelers crossing areas with little to no access to clean water may find themselves packing a burdensome amount of bottled water to last the duration of their travel. Thus, groups or individuals that live in or travel to such areas find difficulty in securing enough clean water for daily use.

SUMMARY OF THE INVENTION

Described herein is a portable water filtration apparatus and method for filtering water contained in a plastic drinking bottle. The apparatus includes a cap piece, a filter, and filter housing that includes openings. The filter includes hydrophilic hollow fibers and hydrophobic hollow fibers, wherein the hydrophobic hollow fibers are configured to allow air to flow into the plastic drinking bottle through the cap piece. Inside the bottle, the filtration apparatus contacts water to be filtered. Upon introduction of a pressure differential, water flows from inside the bottle, through the openings of the filter housing, through the filter, and out through the cap piece. Air may enter the plastic drinking bottle through the filtration apparatus comprising hydrophobic filter media.

According to some embodiments, a portable water filtration apparatus for a squeezable bottle may include: a cap piece comprising a mouthpiece and a threaded portion, wherein the threaded portion is configured to screw onto the squeezable bottle; and a filter fluidly connected to the cap piece, wherein the filter comprises a plurality of hydrophilic hollow fibers and a plurality of hydrophobic hollow fibers, the hydrophobic hollow fibers are configured to allow air to flow into the squeezable bottle through the cap piece.

According to any of these embodiments, the hydrophobic hollow fibers may comprise 2%-20% of a total number of fibers of the filter. In any of these embodiments, the threaded portion of the mouthpiece may have a female 28 mm standard thread configured to screw onto a standard Plastic Closure Only (PCO) 28 drinking bottle.

In any of these embodiments, a gasket may be configured to seal a joint between the filtration apparatus and the squeezable bottle. In any of these embodiments, the gasket may have a thickness of 1 mm-3 mm. In any of these embodiments, the filter may include activated carbon.

In any of these embodiments, the filter may be housed within a filter housing comprising a plurality of openings. In any of these embodiments, the filter housing may have a length of 100 mm-200 mm. In any of these embodiments, the filter housing may have a diameter of 10-30 mm.

According to some embodiments, a method of filtering water contained in a squeezable bottle, includes: filling the squeezable bottle with water; screwing a portable filtration apparatus onto the squeezable bottle, the portable filtration apparatus comprising a cap piece comprising a mouthpiece and a threaded portion, wherein the threaded portion is configured to screw onto the squeezable bottle, and a filter fluidly connected to the cap piece, wherein the filter comprises a plurality of hydrophilic hollow fibers and a plurality of hydrophobic hollow fibers, the hydrophobic hollow fibers are configured to flow air into the squeezable bottle through the cap piece; and flowing a filtrate out through the mouthpiece from the filter in response to a pressure differential between an inside portion of the squeezable bottle and an outside portion of the squeezable bottle.

In any of these embodiments, the hydrophobic hollow fibers may comprise 2%-20% of a total number of fibers of the filter. In any of these embodiments, the threaded portion of the mouthpiece may have a female 28 mm standard thread configured to screw onto a standard Plastic Closure Only (PCO) 28 drinking bottle.

In any of these embodiments, the gasket may be configured to seal a joint between the filtration apparatus and the squeezable bottle. In any of these embodiments, the gasket has a thickness of 1 mm-3 mm.

In any of these embodiments, the filter may comprise activated carbon. In any of these embodiments, the filter may be housed within a filter housing comprising a plurality of openings. In any of these embodiments, filter housing may have a length of 100 mm-200 mm. In any of these embodiments, the filter housing may have a diameter of 10 mm-30 mm.

In any of these embodiments, the pressure differential may be in response to squeezing an outside portion of the squeezable bottle. In any of these embodiments, the pressure differential may be in response to applying suction at the mouthpiece.

In any of these embodiments, the filter may be configured to at least produce a turbidity reduction in a water sample from an initial turbidity of 40 Nephelometric Turbidity Unit (NTU) to a final turbidity of less than 1 NTU, under conditions described in the World Health Organization's (WHO) Standard International Scheme to Evaluate Household Water Treatment Technologies—Filtration Batch System Technology V 2.0 (Geneva, 2016), wherein the initial turbidity is obtained through an addition of fine test dust (ISO spec. 12103-A2) to reverse osmosis treated water. In any of these embodiments, the filter may be configured to continuously flow at least 6,000 liters of reverse osmosis treated water having less than 1 NTU.

In any of these embodiments, the filter may be configured to achieve a percent reduction of bacteria of at least 99%, under conditions described in the World Health Organization's (WHO) Standard International Scheme to Evaluate Household Water Treatment Technologies—Filtration Batch System Technology V 2.0 (Geneva, 2016).

BRIEF DESCRIPTION OF THE DRAWINGS

The invention will now be described, by way of example only, with reference to the accompanying drawings, in which.

DETAILED DESCRIPTION OF THE INVENTION

Figure 1:
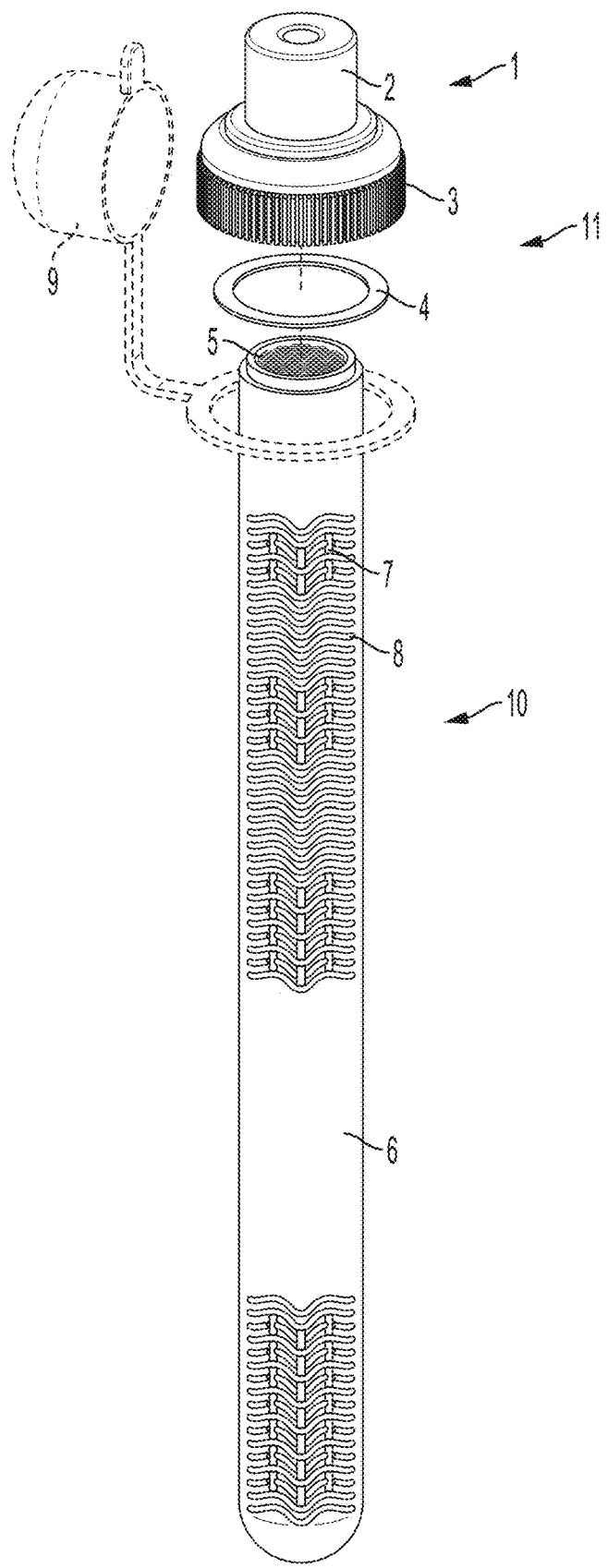
FIG. 1 shows a perspective view of a portable water filtration apparatus, according to some embodiments.

Access to clean water may be expanded by disseminating a portable, low-cost, and re-usable filtration apparatus. In particular, the filtration apparatus may be configured to seal onto a mass-produced and readily available plastic drinking bottle. The plastic drinking bottle may have an opening of a given diameter and a body with a given length and stiffness. In some embodiments, the filtration apparatus may include a cap piece, a gasket, and a filter comprising the filter media and filter housing. The filtration apparatus may be attached onto the opening of the plastic drinking bottle, wherein the bottle contains water to be filtered. The joint between the apparatus and bottle opening may be sealed with a gasket. Upon introduction of a pressure differential between the inside and outside portion of the plastic drinking water, water flows from inside the bottle, through the filter housing, and out through the cap piece. Air may enter the plastic drinking bottle through the filtration apparatus comprising hydrophobic filter media.

In some embodiments, the cap piece may be fluidly connected to the filter. The fluid connection allows the filtrate to flow from the filter out through the cap piece. In some embodiments, the cap piece may comprise at least two portions: a mouthpiece and a threaded portion. The mouthpiece includes an opening for the filtrate to flow out of the filtration apparatus. The opening may also allow air to flow into the plastic drinking bottle. In some embodiments, the mouthpiece may be stationary. In some embodiments, the mouthpiece may be pressed or pulled to allow air to flow. In some embodiments, the threaded portion allows the cap piece to be screwed onto a plastic drinking bottle. In another embodiment, the cap piece may include a portion that snaps onto the opening of the plastic drinking bottle.

In some embodiments, the gasket may be used to seal the filtration apparatus to the plastic drinking bottle. The gasket may vary in thickness to prevent leaks during use or transport. The gasket may be separate or integral to the cap piece.

In some embodiments, the filter media may comprise hydrophilic and hydrophobic hollow fibers. The use of hydrophilic and hydrophobic hollow fibers allows the filter to attract and repel water. The water attraction enables water filtration. The water repulsion enables air to flow into the plastic drinking bottle. In some embodiments, air may flow from outside the bottle to the inside of the bottle by way of the hydrophobic hollow fiber and the cap piece.

In some embodiments, the filter media may comprise hydrophilic and hydrophobic hollow fibers that may comprise pores. In some embodiments, the walls of the hollow fibers may comprise pores that may filter contaminants from water. The size of the pores may depend on the size of contaminants targeted for removal. In some embodiments, the nominal pore size may be 0.1 to 0.01 microns. Contaminants larger than the pore size may not enter the hollow fibers through the pores. Thus, the contaminants larger than the pore size are filtered from the water. In some embodiments, the contaminants may include bacteria, cysts, protozoa, sediment, and/or debris. In some embodiments, the contaminants may include viruses.

In some embodiments, the filter media may comprise hydrophilic and hydrophobic hollow fibers housed within the filter housing. In some embodiments, the hollow fibers may be flexible and may be folded in a U shape to fit into the filter housing. In the U shape, the hollow fiber ends face the cap piece. In another embodiment, the hollow fibers may be swirled inside the filter housing with the fiber ends facing toward the cap piece. In some embodiments, the ends of the hollow fibers may face the cap piece to direct clean water towards the cap piece. In another embodiment, the filter media may comprise activated carbon. The activated carbon may filter out chemical contaminants such as chlorine and fluorine to provide safe drinking water. The removal of chemical contaminants may also affect the taste of the filtered water.

In some embodiments, a portion of the spacing between the filter media may be sealed. The seal prevents contaminated water from flowing out of the plastic drinking bottle. In some embodiments, the sealant may be placed at a top portion of the filter housing that may connect to the cap piece. In some embodiments, the sealant may comprise polyurethane resin. In some embodiments, the filter housing containing hydrophilic and hydrophobic hollow fibers may be placed in liquid polyurethane such that the ends of the hollow fibers and top portion of the filter housing (which may connect to the cap piece) are dipped in liquid polyurethane resin. The liquid polyurethane resin may be allowed to dry. Pieces of the polyurethane resin are removed to open the ends of the hollow fibers. The polyurethane resin that remains within the top portion of filter housing seals the spacing between the hollow fibers and filter housing. In some embodiments, the resin within the top portion of the filter housing may have a thickness of 0.2 to 1 inch.

In some embodiments, the filter housing includes openings that allow water to access the filtering media. The openings in the filter housing may be sized and shaped appropriately to reduce debris from clogging the filter. The openings may be shaped as circles, ovals, slits, or polygons.

In some embodiments, the filter housing has a length which extends inside the plastic drinking bottle. The filter housing may have a length suitable for the plastic drinking bottle. The length of the plastic drinking bottle may depend on its volume capacity. Typical volume capacities include 8 ounces, 16 ounces, 20 ounces, 24 ounces, 1 Liter, and 2 Liters. Thus, the length of the filter housing may be, for example, 40% to 90% of the length of the plastic drinking bottle. This range may enable filtering of all water contained within the bottle, regardless of the bottle's volume capacity. Additionally, a longer length allows more vertical space to pack the filter media within the filter housing. Thus, the filter may have a maximum contact area with the contaminated water to ensure that clean water is passed through the filter at an acceptable flowrate.

In some embodiments, the filter housing fits within the opening of the plastic drinking bottle. The filter housing may have a diameter suitable for a narrow and wide mouth plastic drinking bottle. For example, the diameter of the filter housing may be 15 mm to 30 mm for a narrow mouth plastic drinking bottle. In another embodiment, the diameter may be 40 mm to 60 mm for a wide mouth plastic drinking. The amount of filter media within the filter housing may depend on the diameter of the filter housing. A wider diameter allows more lateral space to pack the filter media within the filter housing. Thus, the filter may have a maximum contact area with the contaminated water to ensure that clean water is passed through the filter at an acceptable flowrate.

The pressure differential between the inside and outside portion of the plastic drinking bottle allows filtered water to flow from the filter out through the cap piece. The pressure differential introduced to flow the filtrate may depend on the type of plastic drinking bottle. The plastic drinking bottle may be new or recycled and may have a given stiffness. The stiffness or ability to apply pressure to fold or bend the plastic drinking bottle may depend on the chain length of the polymers which make up the bottle. Plastic drinking bottles are commonly made from polymers such as polyethylene terephthalate (PET) and low density polyethylene (LDPE). A longer polymer chain length corresponds to a stiffer plastic. Due to pressure build up, carbonated drinks may be contained in bottles that are stiffer than bottles used for water or flat drinks. Thus, the plastic drinking bottles may be manufactured with an appropriate stiffness suitable for carbonated and non-carbonated drinks. In some embodiments, the pressure differential may be in response to squeezing the outside portion of the bottle. The filtrate flow rate upon squeezing may depend on the stiffness of the plastic drinking bottle. In another embodiment, the pressure differential may be in response to suction at the mouthpiece. The filtrate flow rate upon suction may depend on the stiffness of the plastic drinking bottle. In another embodiment, the pressure differential may be in response to simultaneously squeezing the bottle and applying suction.

In some embodiments, the introduction of the pressure differential between the inside and outside portion of the plastic drinking bottle may cause the bottle to change its shape (e.g. fold, bend, or collapse). In some embodiments, air flow through the hydrophobic hollow fibers may allow for the plastic drinking bottle to re-inflate to its original shape after the filtrate has exited the filter.

The water used to fill the plastic drinking bottle may be from water sources including rivers, lakes, and ponds. Such water sources may contain unsafe levels of microbiological and chemical contaminants. In some embodiments, the filtration apparatus may be placed to allow the filter to contact the contaminated water inside the plastic drinking bottle. During use, the filtration apparatus may be used to remove contaminants and provide clean drinking water.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a", "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Figure 2:
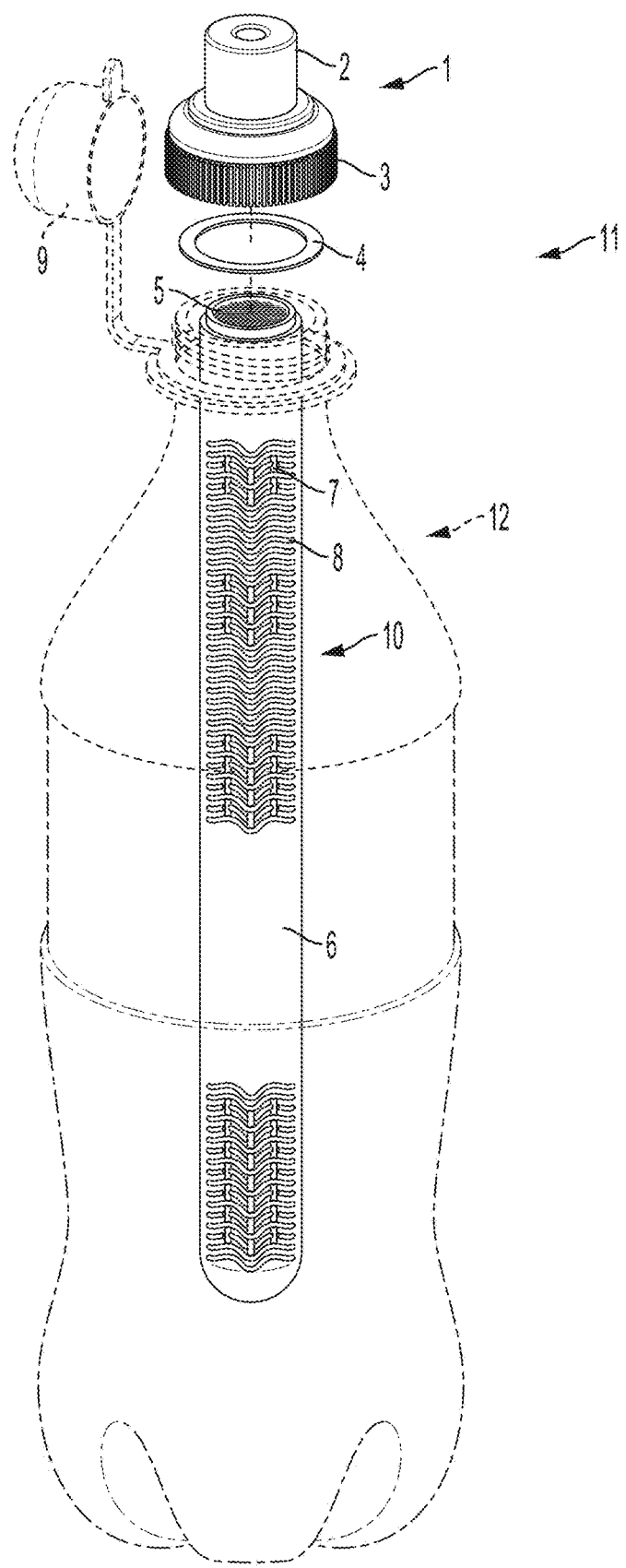
FIG. 2 shows a perspective view of FIG. 1, according to one embodiment.

Described herein is a low-cost, easy to use, portable water filtration apparatus that is configured to screw onto commonly produced and available plastic drinking bottles. Water contained within the plastic drinking bottle may flow through the filtration apparatus to provide clean drinking water. FIG. 1 shows an embodiment of a filtration apparatus comprising a cap piece 1, a gasket 4, and a filter 10 comprising the filter media 5 and filter housing 6. The cap piece 1 may be fluidly connected to the filter 10 to enable a filtrate to flow from the filter 10 and out through the cap piece 1. The fluid connection also allows air to flow to the filter 10 from the cap piece 1. The filtration apparatus 11 may be configured to attach to a plastic drinking bottle 12, as shown in FIG. 2. Introduction of a pressure differential between the inside and outside portion of the plastic drinking bottle 12 allows water to flow from inside the bottle 12, through the filter 10, and out through the cap piece 1.

In some embodiments, the cap piece 1 may comprise at least a mouthpiece 2 and a threaded portion 3. The mouthpiece 2 may include an opening to allow the filtrate to flow out of the cap piece 1. In an embodiment, the mouthpiece 2 may be stationary. In another embodiment, the mouthpiece 2 may be pressed or pulled to allow air to flow through the cap piece 1. In some embodiments, the threaded portion 3 has a female 28 mm standard thread configured to screw onto the opening of a PCO 28 drinking bottle. In another embodiment, the cap piece 1 may include a portion that snaps onto the opening of the plastic drinking bottle.

In some embodiments, the filtration apparatus may comprise a cap 9. The cap 9 may be used to cover the cap piece 1 when not in use. In some embodiments, cap 9 may include a protrusion in an interior portion of the cap 9. The protrusion may be sized to fit into the opening of the mouthpiece 2 to prevent leaks when not in use.

In some embodiments, the gasket 4 seals the joint between the cap piece 1 and the opening of the plastic drinking bottle 12 to prevent water from spilling during use or transport. In some embodiments, the gasket 4 may be separate or integral to the cap piece 1. The gasket may have a thickness to effectively seal the joint. For example, the gasket thickness may be less than 1 mm, less than 2 mm, less than 3 mm, or less than 4 mm. In some embodiments, the gasket may be a silicone gasket.

Figure 3:
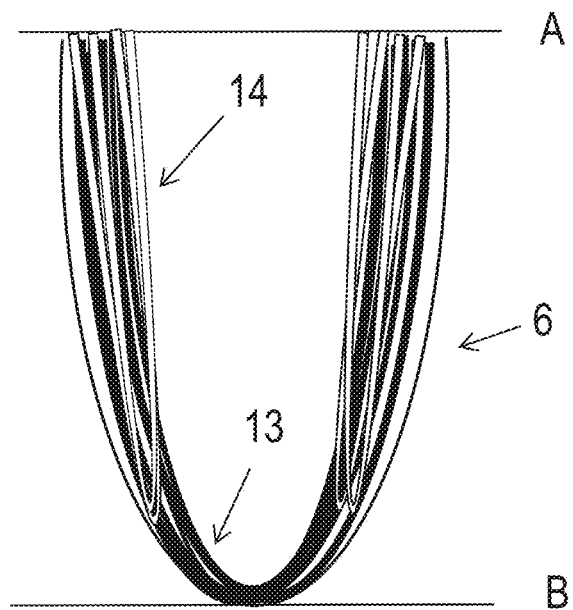
FIG. 3 shows an exemplary schematic of hollow fiber arrangements, according to some embodiment.

The filter media 5 may comprise hydrophilic hollow fibers 13 and hydrophobic hollow fibers 14, as shown in the exemplary schematic of FIG. 3. The combination of hydrophilic and hydrophobic hollow fibers provides at least two benefits. For example, the hydrophilic hollow fibers 13 attract water and encourage a maximum contact area between the hydrophilic hollow fibers 13 and the water. On the other hand, the hydrophobic hollow fibers 14 repel water and are configured to flow air into the plastic drinking bottle 12. Additionally, the flow of air through the hydrophobic hollow fibers 14 promotes shorter filter drying times and reduces biological contamination to maintain a longer filter lifetime.

In some embodiments, the filter media 5 may comprise hydrophilic and hydrophobic hollow fibers 13, 14 that may comprise pores. In some embodiments, the walls of the hollow fibers 13, 14 may comprise pores that may filter contaminants from water. The size of the pores may depend on the size of contaminants targeted for removal. In some embodiments, the nominal pore size may be less than 0.01 microns, less than 0.02 microns, less than 0.03 microns, less than 0.04 microns, less than 0.05 microns, less than 0.06 microns, less than 0.07 microns, less than 0.08 microns, less than 0.09 microns, or less than 0.1 microns. Contaminants larger than the pore size may not enter the hollow fibers 13, 14 through the pores. Thus, the contaminants larger than the pore size are filtered from the water. In some embodiments, contaminants including bacteria, cysts, protozoa, sediment, and/or debris may be filtered with 0.1 micron-sized pores. In some embodiments, contaminants including viruses may be filtered with 0.01 micron-sized pores.

Figure 4:
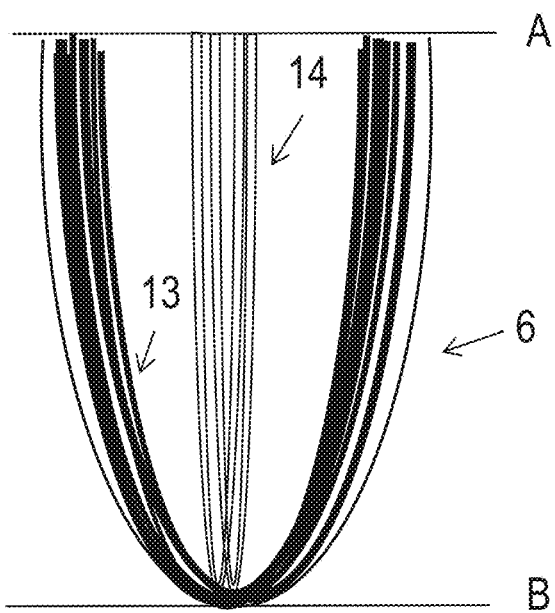
FIG. 4 shows an exemplary schematic of hollow fiber arrangements, according to another embodiment.

The filter media 5 may be housed within the filter housing 6. In an embodiment, the filter media 5 may be folded to fit into the filter housing 6. In some embodiments, the filter media 5 may be sized to span one or more lengths of the filter housing 6. FIGS. 3 and 4 show exemplary schematic representations of filter media comprising hydrophilic hollow fibers 13 and hydrophobic hollow fibers 14. FIG. 3 is an exemplary schematic that shows the hydrophobic hollow fibers 14 arranged on the perimeter of the filter housing 6, whereas FIG. 4 is another exemplary schematic that shows the hydrophobic hollow fibers 14 arranged within the interior of the filter housing 6. In another embodiment, the hydrophilic and hydrophobic fibers may be swirled inside the filter housing 6. Lines A and B represent the top and bottom of the filter housing 6, respectively. In some embodiments, the ends of the hollow fibers 13, 14 may face towards the cap piece 1 to direct clean water toward the cap piece 1. Additionally, the hydrophobic hollow fibers 14 may be arranged or sized to extend passed the hydrophilic hollow fibers 13 at Line A to facilitate efficient air transport into the filter.

In some embodiments, a top portion of the spacing between the filter media 5 and the filter housing 6 may be sealed with polyurethane resin. The sealant prevents contaminated water from flowing out of the plastic drinking bottle 12. In some embodiments, the filter housing 6 containing hydrophilic and hydrophobic hollow fibers 13, 14 may be placed in liquid polyurethane such that the ends of the fibers and a top portion of the filter housing (which may connect to the cap piece) are dipped in liquid polyurethane resin. The liquid polyurethane resin may be allowed to dry. Pieces of the polyurethane resin are removed to open the ends of the hollow fibers. The polyurethane resin that remains within the top portion of the filter housing seals the spacing between the hollow fibers 13, 14 and filter housing 6. In some embodiments, the thickness of the resin at the top portion of the filter housing 6 may be at least 0.2 inches, at least 0.3 inches, at least 0.4 inches, at least 0.5 inches, at least 0.6 inches, at least 0.7 inches, at least 0.8 inches, at least 0.9 inch, or at least 1 inch.

In some embodiments, the filter 10 includes a filter housing 6 with a plurality of openings 7 and a plurality of ridges 8. The openings 7 may be arranged between ridges 8 and the ridges 8 may be grouped into two or more sections. Openings located at the top, middle, and/or bottom sections of the filter housing 6 may allow water to contact the filter media 5 at different water levels. The openings 7 may be any suitable size and geometry to allow water to contact the filter media 5 while preventing debris from entering the filter housing 6. For example, the openings may have a width and/or length of less than 1 mm, less than 2 mm, less than 3 mm, or less than 4 mm. In some embodiments, the openings 7 may be shaped as circles, ovals, slits, or polygons.

The filter housing 6 extends into the interior of the plastic drinking bottle 12. As such, the filter housing 6 may have a suitable length depending on the volume capacity of the plastic drinking bottle 12. In some embodiments, a suitable length may allow the volume contained within the bottle to be filtered. Plastic drinking bottles are commonly available in 8 ounces, 16 ounces, 20 ounces, 24 ounces, 1 Liter, and 2 Liter bottles. To filter water contained in various sized bottles, the filter housing 6 may be 40% to 90% of the length of the plastic bottle. For example, the filter housing may have a length less than 40%, less than 50%, less than 60%, less than 70%, less than 80%, or less than 90% of the length of the plastic drinking bottle.

In some embodiments, the filter housing 6 may fit inside the opening of the plastic drinking bottle 12. The filter housing 6 may have a suitable diameter for narrow and wide mouth plastic drinking bottles. For example, the filter housing 6 may be less than 15 mm, less than 20 mm, less than 25 mm, or less than 30 mm for a narrow mouth plastic drinking bottle. In another embodiment, the diameter may be less than 40 mm, less than 45 mm, less than 50 mm, less than 55 mm, or less than 60 mm for a wide mouth plastic drinking bottle.

In some embodiments, the pressure differential is in response to squeezing the outside portion of the plastic drinking bottle 12. In another embodiment, the pressure differential is in response to applying suction at the mouthpiece 2. In another embodiment, the pressure differential is in response to simultaneous squeezing the bottle 12 and applying suction at the mouthpiece 2. The pressure differential introduced to flow the filtrate from the filter 10 to the cap piece 1 may depend on the stiffness of the plastic drinking bottle. Upon squeezing or applying suction, the plastic drinking bottle may change its shape depending on its stiffness. In some embodiments, the hydrophobic hollow fibers 14 may be configured to allow air to flow inside the bottle. The air flow into the bottle may enable the bottle to re-inflate to its original shape.

In some embodiments, the number of hydrophobic hollow fibers 14 that may allow the bottle to re-inflate to its original shape after flowing filtrate out of the cap piece 1 may depend on the plastic stiffness. The stiffness of plastic drinking bottle may rely on the polymers from which the bottle is manufactured. Bottles manufactured with long-chained polymers may provide higher stiffness than those made from short-chained polymers. For example, a stiff, yet squeezable plastic drinking bottle may have a tendency to use air from outside of the bottle to re-inflate to its original shape after being squeezed. Whereas a less stiff plastic drinking bottle may not have a tendency to use air from outside the bottle to re-inflate to its original shape after being squeezed.

A suitable number of hydrophobic hollow fibers 14 may enable sufficient air flow to re-inflate the bottle while maintaining suitable filter efficiency. In some embodiments, the hydrophobic hollow fibers 14 may be a suitable percentage, which may depend, for example, on bottle type and filter efficiency as discussed above. For example, the hydrophobic hollow fibers 14 may be less than 2%, less than 3%, less than 4%, less than 5%, less than 6%, less than 7%, less than 8%, less than 9%, less than 10%, less than 11%, less than 12%, less than 13%, less than 14%, less than 15%, less than 16%, less than 17%, less than 18%, less than 19%, or less than 20% of the total number of hollow fibers.

Organic chemicals, such as chlorine and fluoride, may be present in high concentrations for example in tap water in urban areas. The amount of organic chemicals present in drinking water may affect not only taste, but also the health of drinker. In some embodiments, the filtering media may comprise activated carbon to remove such organic chemicals. For example, the activated carbon may be a hollow cylinder, wherein the filtrate flows from the inner portion of the hollow cylinder out through the cap piece.

Figure 5:
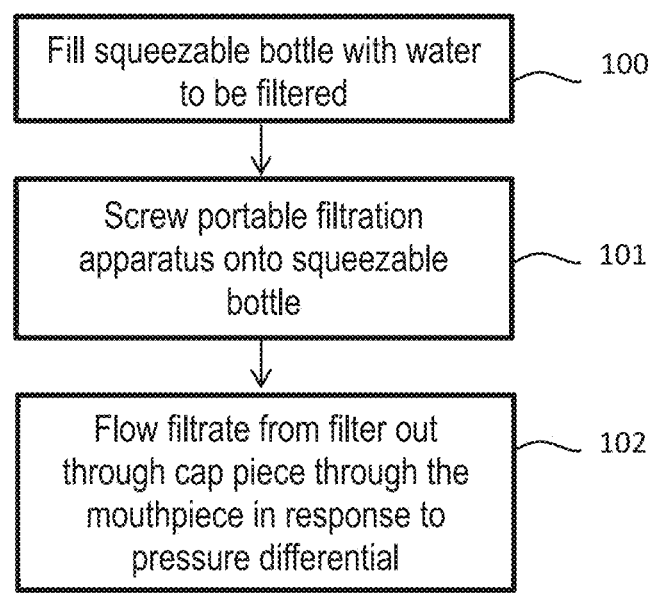
FIG. 5 shows an exemplary flow diagram of filtering water, according to some embodiments.

FIG. 5 is an exemplary flow diagram of filtering water, according to some embodiments. At step 100, the bottle may be partially or completely filled with water to be filtered (contaminated water). The water may be from sources including rivers, lakes, ponds, rain, and/or the tap. At step 101, the portable water filtration apparatus 11 is inserted into the plastic drinking bottle 12 and secured onto the bottle by screwing the threaded portion 3 of the cap piece 1 onto the opening of the bottle 12. A gasket 4 is used to seal the joint between the filtration apparatus 11 and the plastic drinking bottle 12. The gasket 4 serves to prevent water from spilling during use or transport. The filtration apparatus 11 includes the filter 10, which may be in fluid connection with the cap piece 1.

At step 102, filtered water or a filtrate, may flow from the filter 10 and out through of the mouthpiece 2 of the cap piece 1 in response a pressure differential between an inside and an outside portion of the plastic drinking bottle 12. The pressure differential may result in response to outside stimulus, for example, by squeezing an outside portion of the plastic drinking bottle 12, by applying suction at the mouthpiece 2 of the cap piece 1, and/or by flipping the bottle 12 upside down.

The pressure for passing water through the filter 10 may be less than 1 bar, less than 2 bar, less than 3 bar, less than 4, or less than 5 bar. The corresponding flow rate may be less than 1 Liters per minute, less than 2 Liters per minute, less than 3 Liters per minute, less than 4 Liters per minute, or less than 5 Liters per minute.

The filter 10 meets the World Health Organization (WHO) *E. coli* and protozoa reduction requirements described in the 2016 WHO International Standard Scheme to Evaluate Household Water Treatment Technologies—Filtration Batch System Technology V 2.0, Geneva. This international scheme includes testing microbiologically spiked water samples, one with low turbidity (less than 1 Nephelometric Turbidity Unit (NTU)) and another with high turbidity (40 NTU). The low turbidity water may be reverse osmosis treated water and the high turbidity water may be obtained through the addition of fine test dust (ISO spec. 12103-A2) to reverse osmosis treated water, as described in the WHO's International Standard Scheme. During operation under the procedures set forth in the above-mentioned WHO International Scheme, the filter 10 may reduce *E. coli* present in contaminated water by a suitable reduction. For example, the filter 10 may reduce *E. coli* by a percentage greater than 99.99%, greater than 99.999%, greater than 99.999%, or greater than 99.9999%. Also, the filter 10 may be configured to at least reduce turbidity in a water sample from 40 NTU to less than 1 NTU.

The portable water filtration apparatus 11 may be used several times. The number of liters that may pass through the filter may depend on levels of turbidity and microbiological contamination. For example, the filter 10 may flow less than 1,000 Liters, less than 2,000 Liters, less than 3,000 Liters, less than 4,000 Liters, less than 5,000 Liters, less than 6,000 Liters, less than 7,000 Liters, less than 8,000 Liters, less than 9,000 Liters, or less than 10,000 Liters of clean water having less than 1 NTU.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A portable water filtration apparatus for a squeezable bottle, the portable water filtration apparatus comprising:
   a cap piece comprising a mouthpiece and a threaded portion, wherein the threaded portion is configured to screw onto the squeezable bottle configured to hold water; and
   a filter fluidly connected to the cap piece, wherein the filter comprises a plurality of hydrophilic hollow fibers and a plurality of hydrophobic hollow fibers, the hydrophobic hollow fibers comprise 2%-20% of a total number of fibers of the filter, the hydrophobic hollow fibers are configured to allow air to flow into the squeezable bottle through the cap piece, the filter is housed in a filter housing comprising a plurality of openings positioned along a length of the filter housing, and the portable water filtration apparatus is configured to flow a filtrate from the filter out through the mouthpiece in response to a pressure differential between an inside portion of the squeezable bottle and an outside portion of the squeezable bottle.

2. The portable water filtration apparatus of claim 1, wherein the threaded portion of the mouthpiece has a female 28 mm standard thread configured to screw onto a standard Plastic Closure Only (PCO) 28 drinking bottle.

3. The portable water filtration apparatus of claim 1, comprising a gasket configured to seal a joint between the filtration apparatus and the squeezable bottle.

4. The portable water filtration apparatus of claim 3, wherein the gasket has a thickness of 1 mm-3 mm.

5. The portable water filtration apparatus of claim 1, wherein the filter comprises activated carbon.

6. The portable water filtration apparatus of claim 1, wherein the filter housing has a length of 100 mm-200 mm.

7. The portable water filtration apparatus of claim 1, wherein the filter housing has a diameter of 10-30 mm.

8. A method of filtering water contained in a squeezable bottle, comprising:
   filling the squeezable bottle with water;
   screwing a portable filtration apparatus onto the squeezable bottle, the portable filtration apparatus comprising a cap piece comprising a mouthpiece and a threaded portion, wherein the threaded portion is configured to screw onto the squeezable bottle, and a filter fluidly connected to the cap piece, wherein the filter comprises a plurality of hydrophilic hollow fibers and a plurality of hydrophobic hollow fibers, the hydrophobic hollow fibers comprise 2%-20% of a total number of fibers of the filter, the hydrophobic hollow fibers are configured to flow air into the squeezable bottle through the cap piece, the filter is housed in a filter housing comprising a plurality of openings positioned along a length of the filter housing; and
   flowing a filtrate out through the mouthpiece from the filter in response to a pressure differential between an inside portion of the squeezable bottle and an outside portion of the squeezable bottle.

9. The method of claim 8, wherein the threaded portion of the mouthpiece has a female 28 mm standard thread configured to screw onto a standard Plastic Closure Only (PCO) 28 drinking bottle.

10. The method of claim 8, comprising a gasket configured to seal a joint between the filtration apparatus and the squeezable bottle.

11. The method of claim 10, wherein the gasket has a thickness of 1 mm-3 mm.

12. The method of claim 8, wherein the filter comprises activated carbon.

13. The method of claim 8, wherein the filter housing has a length of 100 mm-200 mm.

14. The method of claim 8, wherein the filter housing has a diameter of 10 mm-30 mm.

15. The method claim of 8, wherein the pressure differential occurs in response to squeezing an outside portion of the squeezable bottle.

16. The method claim of 8, wherein the pressure differential occurs in response to applying suction at the mouthpiece.

17. The method claim of 8, wherein the filter is configured to at least produce a turbidity reduction in a water sample from an initial turbidity of 40 Nephelometric Turbidity Unit (NTU) to a final turbidity of less than 1 NTU, under conditions described in the World Health Organization's (WHO) Standard International Scheme to Evaluate Household Water Treatment Technologies Filtration Batch System Technology V 2.0 (Geneva, 2016), wherein the initial turbidity is obtained through an addition of fine test dust (ISO spec. 12103-A2) to reverse osmosis treated water.

18. The method claim of 8, wherein the filter is configured to continuously flow at least 6,000 liters of reverse osmosis treated water having less than 1 NTU.

19. The method claim of 8, wherein the filter is configured to achieve a percent reduction of bacteria of at least 99%, under conditions described in the World Health Organization's (WHO) Standard International Scheme to Evaluate Household Water Treatment Technologies Filtration Batch System Technology V 2.0 (Geneva, 2016).

* * * * *